May 19, 1959   J. J. WILLIAMS, JR   2,887,247
ICE CREAM SPOON DISPENSER
Filed April 22, 1957

INVENTOR.
JOHN J. WILLIAMS, JR.
BY
ATTORNEY

United States Patent Office 2,887,247
Patented May 19, 1959

2,887,247

ICE CREAM SPOON DISPENSER

John J. Williams, Jr., Fort Worth, Tex.

Application April 22, 1957, Serial No. 654,199

1 Claim. (Cl. 221—25)

This invention relates to a device for dispensing ice cream spoons wrapped and sealed in flat paper sleeves, and has for its primary object the provision of a dispenser which ejects only a few spoons at a time.

Another object of the invention is to provide sanitary means for dispensing ice cream spoons as compared with the previous practice of merely placing the spoons in a bin for the convenience of customers.

Another object of the invention is to provide an ice cream spoon dispenser which is easy to load.

An additional object is to provide a dispenser for the described purpose capable of accommodating spoons of various thicknesses and irregular shapes.

An additional but lesser object is to provide a conspicuous advertising medium, such as for ice cream to be sold at the place where the dispenser is installed.

Generally, the invention contemplates an attractive and conveniently operated container including a resilient pressure roller for accommodating spoons of various thicknesses, together with a unique slotted guide for quickly and conveniently inserting the upper ends of flat sleeves containing the spoons.

Figure 1:
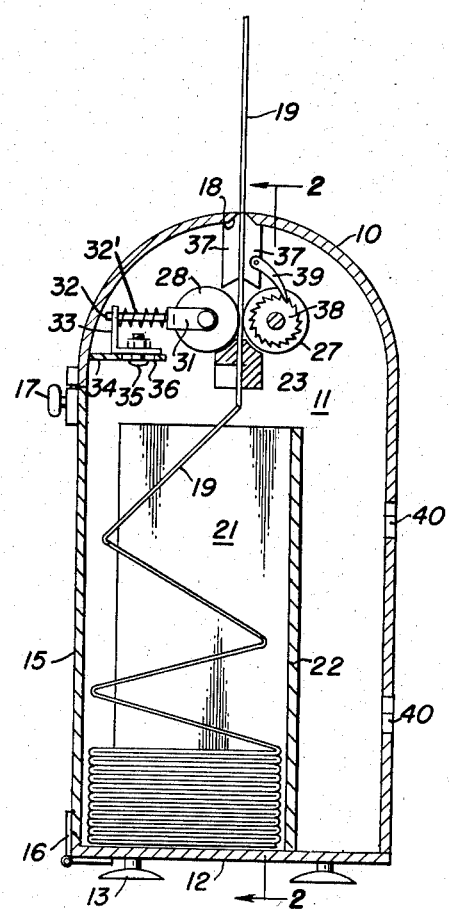
Figure 1 is a vertical sectional view taken on line 1—1 of Figure 2 showing a preferred embodiment of the invention.

The form of the invention shown includes a container having a semicylindrical top 10, side walls 11, a substantially square bottom 12 having suction cup feet 13, an end wall 14, and a hinged door 15 opposite the end wall. Preferably, the door 15 is of transparent material, and is attached at its lower end to the outer edge surface of the container bottom 12 by means of hinges 16. A latch 17 on the upper end of the door 15 detachably secures said door in its closed position.

Aligned slots 18 in the upper center of the top portion 10 of the container accommodate the passage of relatively flat paper sleeves 19 which contain ice cream spoons 20. The sleeves 19 are folded, by reverse bends, between the ends of the spoons 20 in the manner illustrated in Figure 1, and are placed in the container through the door 15 perpendicular to the length of the slots 18 in the container's top portion 10. The folded sleeves 19 are separated from each other by vertical partitions 21, the inner ends of which are connected with a vertical transverse partition 22 parallel with the end wall 14.

Figure 2:
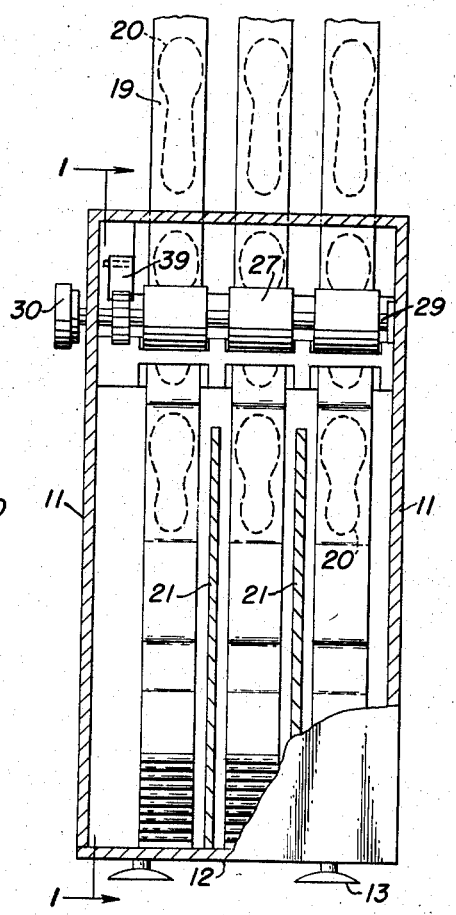
Figure 2 is a vertical sectional view taken on line 2—2 of Figure 1.
Figure 4:
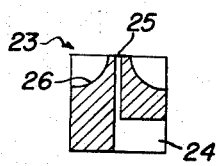
Figure 4 is a transverse section taken on line 4—4 of Figure 3. (It is to be noted that Figures 3 and 4 are reversed relative to Figure 1.)
Figure 3:
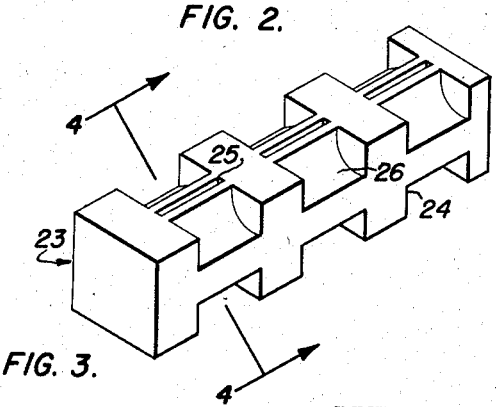
Figure 3 is a perspective view of the slotted guide for initially inserting the upper ends of paper sleeves between rollers.

As shown in detail in Figures 3 and 4, a slotted guide element 23 extends across the container between the side walls 11 near the lower center of the container upper portion 10. Recesses 24 are provided in one lower side of the guide element 23 for initially guiding the upper ends of the sleeves 19 into and through vertical slots 25. The upper side edges of the guide element 23 are arcuately recessed, as at 26, for accommodating friction and resilient pressure rollers 27 and 28. The friction rollers 27 are mounted on a shaft 29 journalled in and extending through the side walls 11, and one end of which shaft is provided with a knob 30 for manually rotating the friction rollers. Opposite each friction roller 27 there is a resiliently mounted pressure roller 28, each mounted in a U-shaped bracket 31, and which bracket is provided with a central and outwardly extending supporting rod 32. Each supporting rod 32 is slidably received in a corresponding opening, not numbered, in the upstanding flange of an L-shaped bracket 33. The remaining flange of the bracket 33 is adjustably mounted on a horizontal support 34 by means of a screw 35 positioned through a slot 36 in said horizontal support. A coiled compression spring 32' is mounted around each supporting rod 32 and each spring bears against its corresponding L-shaped bracket 33 and U-shaped bracket 31 whereby the respective pressure rollers 28 are urged toward corresponding friction rollers 27. Above the rollers 27 and 28 and beneath the slots 18 in the upper container portion 10, there are additional transverse slotted guides 37 for directing the sleeves 19 upwardly and out of the container, as shown in Figures 1 and 2.

A toothed wheel 38 is secured to the shaft 29, and which toothed wheel is acted upon by a dog 39 pivotally secured to the upper guide 37. As shown in Figures 1 and 2, the dog 39 is arranged to permit rotation of the friction rollers 27 in one direction only and to move the sleeves 19 upwardly.

In operation, the described dispenser is placed at some convenient location for use by customers. The dispenser may be secured to a flat surface, as by means of suction cups 13, or the device may be secured to a wall on projecting screws, not shown, by means of bayonet slots 40, such as shown in the end wall 14. By manual rotation of the knob 30 the sleeves 19 are moved upwardly, and after a length of sleeve containing a spoon 20 has been ejected, the sleeve is torn off and the spoon is removed.

The invention is not limited to the exemplary construction herein shown and described, but may be made in various ways within the scope of the appended claim.

What is claimed is:

A container adapted to dispense spoons sealed in elongated paper sleeves, said container comprising a top portion, bottom, vertical side walls, said top portion including aligned dispensing slots thereacross, a shaft journalled in opposite said side walls and extending through one said side wall, said shaft being below and parallel with said elongated slots, a knob on the extending end of said shaft, friction rollers on said shaft within said container, pressure rollers horizontally opposite said friction rollers, means resiliently mounting said pressure rollers for action independent of each other and each being normally urged toward a friction roller, said means resiliently mounting said pressure rollers comprising U-shaped brackets in which said pressure rollers are rotatably mounted, an outwardly extending supporting rod on each said U-shaped bracket, a supporting bracket mounted on an inner wall of said container and a compression spring between each said U-shaped bracket and said supporting bracket normally urging said pressure roller toward said friction rollers, and a guide element beneath said pressure rollers and friction rollers, said guide element including vertical slots therethrough and beneath respective pairs of pressure and friction rollers.

References Cited in the file of this patent

UNITED STATES PATENTS

| | | |
|---|---|---|
| 1,724,788 | Boggs | Aug. 13, 1929 |
| 2,117,396 | Birr | May 17, 1938 |
| 2,465,876 | Hornung | Mar. 29, 1949 |